US009833685B2

(12) United States Patent
Tomer

(10) Patent No.: US 9,833,685 B2
(45) Date of Patent: Dec. 5, 2017

(54) INTERCHANGEABLE IMAGE EXHIBIT SYSTEM

(71) Applicant: David Tomer, Sebago, ME (US)

(72) Inventor: David Tomer, Sebago, ME (US)

(73) Assignee: IMEDGEBOARDS, LLC, Sebago, ME (US)

( * ) Notice: Subject to any disclaimer, the term of this patent is extended or adjusted under 35 U.S.C. 154(b) by 68 days.

(21) Appl. No.: 14/827,269

(22) Filed: Aug. 14, 2015

(65) Prior Publication Data

US 2016/0045812 A1 Feb. 18, 2016

Related U.S. Application Data

(60) Provisional application No. 62/038,531, filed on Aug. 18, 2014.

(51) Int. Cl.
| | |
|---|---|
| *A63C 5/03* | (2006.01) |
| *A63C 5/00* | (2006.01) |
| *G09G 5/00* | (2006.01) |
| *F16M 11/04* | (2006.01) |
| *A63C 17/01* | (2006.01) |

(52) U.S. Cl.
CPC .......... *A63C 5/003* (2013.01); *F16M 11/041* (2013.01); *G09G 5/003* (2013.01); *A63C 5/03* (2013.01); *A63C 17/01* (2013.01); *A63C 2203/08* (2013.01); *A63C 2203/42* (2013.01)

(58) Field of Classification Search
CPC ..... A63C 17/26; A63C 5/003; A63C 2203/08; F16M 13/00; F16M 11/041; A63B 71/0622
See application file for complete search history.

(56) References Cited

U.S. PATENT DOCUMENTS

| | | | | |
|---|---|---|---|---|
| 2,101,500 | A * | 12/1937 | Jagus | G09F 1/14 40/606.13 |
| 7,487,991 | B2 * | 2/2009 | Degasperi | A63C 5/003 280/14.22 |
| 8,014,656 | B2 * | 9/2011 | Woodman | B63B 25/002 396/25 |
| 8,171,660 | B2 | 5/2012 | Joynt | |
| 8,468,719 | B2 | 6/2013 | Dvorak | |
| 8,506,140 | B2 | 8/2013 | Edmisten | |
| 8,638,557 | B2 * | 1/2014 | Tsai | F16M 11/041 248/919 |
| 8,672,719 | B2 * | 3/2014 | Grimes | B63B 35/73 114/364 |
| 8,979,710 | B2 * | 3/2015 | McCready | A63B 71/0622 482/8 |

(Continued)

*Primary Examiner* — Emma K Frick
(74) *Attorney, Agent, or Firm* — Patent Alloy, LLC; Leonard Agneta

(57) ABSTRACT

Systems, apparatus, and methods are disclosed for enhancing the appearance and function of sports equipment. Systems include a mounting pad apparatus for attaching a variety of decorative or functional image exhibits. The disclosed apparatus may be configured to receive image exhibits of different sizes through the arrangement of slideable components, caddies, and other attachment arrangements. Systems, apparatus, and methods are also disclosed for decoratively and functionally enhancing sports equipment items such as sports boards by securing electronic image exhibits that communicate with users and other devices.

14 Claims, 14 Drawing Sheets

(56) References Cited

U.S. PATENT DOCUMENTS

| | | | |
|---|---|---|---|
| 9,174,085 B2* | 11/2015 | Foley | A63B 24/0075 |
| 9,470,356 B1* | 10/2016 | Zaloom | F16M 11/12 |
| 2005/0064774 A1* | 3/2005 | Grune | B63B 35/7906 |
| | | | 441/74 |
| 2005/0170154 A1 | 8/2005 | Breukers | |
| 2008/0248261 A1 | 10/2008 | Bonnett | |
| 2008/0283187 A1 | 11/2008 | Ornetsmuller | |
| 2009/0039609 A1 | 2/2009 | Esposito | |
| 2009/0115181 A1 | 5/2009 | Atherton | |
| 2010/0148483 A1 | 6/2010 | Kopp | |
| 2011/0023340 A1 | 2/2011 | Jimoh | |
| 2011/0309772 A1 | 12/2011 | Forgey | |
| 2012/0025035 A1* | 2/2012 | Huang | F16M 11/04 |
| | | | 248/122.1 |
| 2012/0223493 A1* | 9/2012 | Cortez | A63C 17/01 |
| | | | 280/14.22 |
| 2013/0214701 A1* | 8/2013 | Forgey, II | H05B 37/02 |
| | | | 315/307 |
| 2013/0251330 A1* | 9/2013 | Willenborg | H04N 5/765 |
| | | | 386/224 |
| 2013/0277520 A1* | 10/2013 | Funk | F16M 13/02 |
| | | | 248/274.1 |
| 2013/0303039 A1 | 11/2013 | Logosz | |
| 2014/0263931 A1* | 9/2014 | Chen | F16M 11/041 |
| | | | 248/576 |
| 2014/0278218 A1* | 9/2014 | Chang | G01P 15/00 |
| | | | 702/150 |
| 2015/0093732 A1* | 4/2015 | Ross | A63B 69/18 |
| | | | 434/253 |

* cited by examiner

INTERCHANGEABLE IMAGE EXHIBIT SYSTEM

CROSS REFERENCE TO RELATED APPLICATIONS

This application claims the benefit of U.S. Provisional Application No. 62/038,531, filed Aug. 18, 2014, the disclosure of which is hereby incorporated by reference in its entirety.

BACKGROUND OF THE INVENTION

Field of the Invention

This invention is directed to the field of personalizing sporting equipment. More particularly the invention relates to systems for quickly attaching interchangeable decorative and functional enhancements to sports equipment items.

Description of the Related Art

Outdoor sports enthusiast often desire to personalize their sports equipment. For instance, board sport participants purchase snowboards, surfboards, skateboards, and the like to take part in popular outdoor recreational activities. Such boards can be ordered in a variety of sizes and colors and are frequently customized. Typically, decals and other relatively flat, unobtrusive enhancements that express the user's individual taste are applied in a permanent fashion. However, when the enhancements become damaged, tiresome, outdated, or non-functional, removing them from the board is difficult and time consuming, often destroying the enhancement and sometimes damaging the board.

Enthusiasts engaging in sporting activities are also frequently interested in sharing their experiences with others for notoriety or evaluation purposes, often employing personal electronic communication devices to help facilitate communication. However, handling and operating such devices while performing a sporting activity can be difficult, particularly if the enthusiast's hands are gloved or being used for other purposes. Fastening a device to an equipment item may provide the enthusiast with easier use but subsequently removing the device may harm the item or device, or may make the appearance of the item unseemly after the device has been removed.

In light of these and other existing shortcomings of the prior art, there is a need for a system to quickly attach decorative and functional exhibits to sports equipment items such that the exhibits may be easily removed and exchanged without revealing damage to the item.

SUMMARY OF THE INVENTION

An interchangeable image exhibit system of the present invention comprises one or more image exhibits that alter the look or function of a sports equipment item and are easily removed and exchanged for another exhibit. The image exhibits are preferably flat and are secured to a sports equipment item by a mounting pad that is permanently affixed to the item. The mounting pad and at least one corresponding attachable image exhibit are each adapted to be fitted together securely during use of the sports equipment item but are designed to be easily disconnected from one another when intended by the user. In preferred embodiments of a system of the present invention, multiple image exhibits are interchangeable so that they can be fitted to the same mounting pad. Preferred embodiments of the system may also include a see through cover situated over an image exhibit while the exhibit is fitted to a mounting pad. The cover is rugged and protects the image exhibit from impacts and environmental conditions while still allowing the exhibit to be visible as the sports equipment item is being used.

In some embodiments of the invention, the image exhibit comprises a simple, static, image plate secured to a mounting pad that is fixed to the surface of a sports equipment item. The image plate may include decals, graphics, sculpture, or other image features on one or more sides for providing enhanced appearance to the item. In one embodiment, a removable exhibit is sized to be received by guides on the exhibit side of a mounting pad. Once between the guides, the exhibit is further retained by a pivoting catch which biases the exhibit against a stop. To remove the exhibit from the pad, the catch is moved away from the exhibit so that the exhibit can be removed from between the guides. Thereafter, another similarly sized exhibit may be fitted to the mounting pad. With the mounting pad fixed to a particular sports equipment item, substituting one attachable image plate for another considerably changes the item's appearance.

In other embodiments of the invention, a mounting pad is fitted with an attachable image exhibit comprising an electronic display screen which provides a decorative and/or functional image. Although different display screens may be substituted one for another in the same mounting pad, the screen includes components so that the image displayed on the screen may be affected without removing the screen. In a preferred related embodiment, a display screen image exhibit communicates with popular personal electronic communication devices to receive data that replaces or modifies an image being displayed, according to the preference of the user.

In another embodiment of the present invention, the image exhibit is a fully assembled personal electronic communication device to be used to display decorative image features, receive or provide data, or communicate with one or more electronic recording devices. The personal electronic communication device is enclosed by a protective caddy that itself is attached to an adjustable mounting pad. The pad is adaptable to receive image exhibits or protective caddies of various sizes and includes a locking catch that may be operated to quickly remove the exhibit from the mounting pad.

In still another embodiment of a system of the present invention, a static image plate is adapted to be secured to an adjustable mounting pad. The mounting pad includes a track that is permanently fastened to a sports equipment item and encircled by a resilient cushion. Projecting from the bottom of the image plate is a cam button having a plurality of rigid lobes. A pair of perpendicular slots cross one another along the image exhibit side of the track and are formed with shoulders to connect with the cam button of image plate at the intersection of the slots. To secure the image plate to the mounting pad, the image plate is first positioned so that the button of the plate is placed within the intersection of the track as the cushion is being compressed. The image plate is then rotated 45 degrees to position the rigid lobes of the button under the shoulders of the track as compression of the cushion is maintained. When in position, friction between the image plate and cushion prevent the image from rotating further and thereby maintains the connection between the image plate and the mounting pad. In alternate embodiments, stops or tabs are associated with a similarly adapted image plate to inhibit rotation while the image plate is attached to a slotted mounting pad.

BRIEF DESCRIPTION OF THE DRAWINGS

For illustration purposes, embodiments of the interchangeable image exhibit system are shown applied to a snowboard. However, the invention is suitable for other types of sports equipment items as well as for fastening to other items and structures where the function of an interchangeable image exhibit system is advantageous in a particular environment.

DETAILED DESCRIPTION OF THE INVENTION

Figure 1:
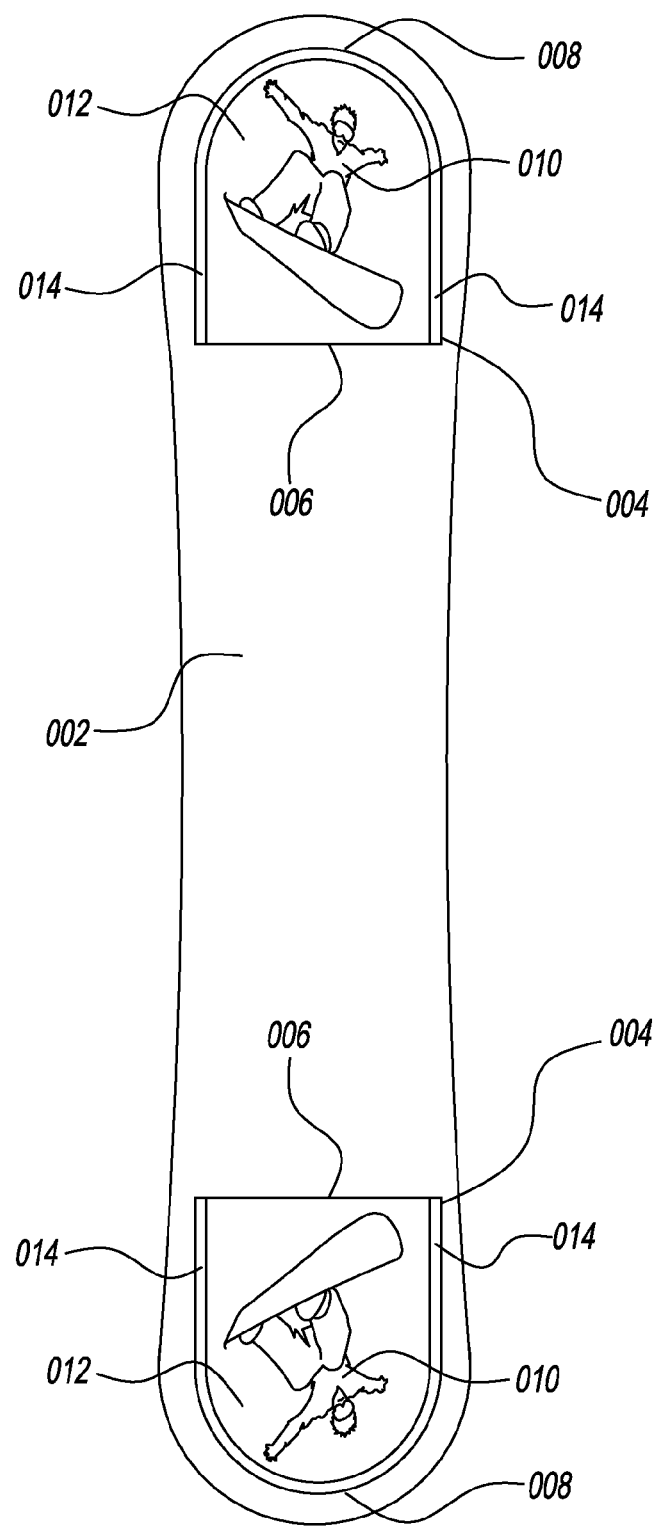
FIG. 1 is an overhead two dimensional view of a sports board having a mounting pad and an attachable image exhibit on both its nose and tail ends.

The following are definitions of some of the terms used herein to describe numerous interchangeable image exhibit system embodiments of the present invention. Unless otherwise specified, the terms are intended to have their broadest possible meaning within the requirements of the law. As used throughout this specification:

The term "attached" or "secured" when referring to an image exhibit connection with a mounting pad that is itself fastened to a sports equipment item is intended to describe a robust connection that is unlikely to be dislodged under normal use of the sports equipment item.

The term "attachable" when referring to an image exhibit refers to the exhibit having a certain size, dimension, caddy, or other characteristic that allows it to be secured to a particular mounting pad.

The term "capsule" or "encapsulate" when used to describe the relationship of a protective cover with an image exhibit is intended to describe any type or combination of protection provided by the protective cover including but not limited to protection from impact and moisture or protection from impact alone.

The term "catch" or "latch" when used to describe a component for securing an image exhibit to a mounting pad is intended to generally include components or mechanisms of either variety that are designed to be easily engaged and disengaged or otherwise secured and released without tools from providing bias to an image exhibit for the purpose of attaching it to a mounting pad.

The term "enclosed" when referring to the relationship between an image exhibit and a caddy includes full or partial contact with the image exhibit such that the image features of the exhibit can be viewed.

The term "image" or "image features" when used to describe that which is provided by an image exhibit is intended to refer to a broad range of pictures, sounds, textures, photos, graphics, data, information, video, media, etc., in ether physical or virtual form.

The term "image exhibit" is intended to include attachable components which fit removably to a mounting pad. Image exhibits may be decorative or functional or both and include but are not limited to graphic image plates, electronic display screens, and personal electronic communication devices. In some embodiments, the term "image exhibit" is intended to include a caddy which may be protective or simply provide a necessary dimension or features so that the image exhibit may be securely fitted to a particular mounting pad.

The term "image plate" is used to describe a static, decorative image exhibit that provides enhancement to a sports equipment item through appearance rather than function.

The terms "interchangeable" or "interchange" when used to describe the replacement of one image exhibit for another, are intended to be synonymous with "exchangeable" or "exchange" and to connote replacing one image exhibit with another that may have the same or a different function or appearance.

The term "mounting pad" is intended to describe a protective apparatus for securing an image exhibit to a sports equipment item, such that image exhibits are viewable and operable and may be quickly and easily exchanged without causing or revealing damage to the sports equipment item. Mounting pads may or may not incorporate a lock, cushion, caddy, track, and/or protective cover.

The term "permanently" when used to describe how a mounting pad is fixed or fastened to a sports equipment item is intended to include mounting pads made integral with a sports equipment item or molded in to the item during the item's manufacture or adhering the pad to an item with a strong adhesive or attaching the pad with destructive clips or fasteners such that removing the mounting pad will damage the sports equipment item, fracture the adhesive bond making it nonfunctional, leave holes or significant marks or indentations in the item, or expose other permanent modifications or damage made to the item to accommodate a connection to the mounting pad.

The term "personal electronic communication device" or "electronic communication device" or "communication device" when referring to a type of image exhibit is intended to refer to fully assembled portable devices having a display screen, including but not limited to smartphones or tablet computers, which fit within a mounting pad of an interchangeable image exhibit system to provide required functions. Similarly, the term "personal electronic communication device" or "electronic communication device" or "communication device" when used to describe a device that is in communication with an image exhibit attached to a mounting pad includes but is not limited to smart phones, computer tablets, and other computer devices which may or may not be adapted for wearing on a person.

The term "removable" or "removably" when used to describe how image exhibits are held by a mounting pad is intended to describe a connection that is secure but can be quickly disengaged from the pad by hand or with a single simple tool, causing or revealing no damage to a sports equipment item.

The term "slideable components" is intended to refer to components of a mounting pad that can be positioned for securing an image exhibit such as a pivoting latch or catch, opposing guides and/or an end stop.

The term "sports equipment item" when used to describe something to which a mounting pad is fastened is intended to include but not be limited to all suitable types of sports equipment, such as boards and small watercraft used for sports or recreation. To be sure, sports equipment item is intended to include all suitable sports boards including: snowboards, surfboards, wakeboards, paddleboards, skateboards and other new or existing sport board types.

The term "static" when used to describe an image exhibit is intended to limit the type of exhibits to image plates and the like; or in other words to image exhibits that provide enhancement only from artwork, graphics, or other material subject matter that is physical and consistently present on the image exhibit rather than from a virtual image which exists or can be eliminated or changed electronically.

The term "virtual" when used to describe image features provided by an image exhibit is generally intended to refer to image features that may be changed or eliminated electronically rather than being physical and consistently present on the image exhibit.

With the above definitions in mind, the present invention is directed to methods, apparatus, and systems for enhancing the appearance and/or function of sports equipment items by securing an interchangeable image exhibits. Such systems have one or more image exhibits that are secured to an equipment item by means of a mounting pad and which may be easily removed and interchanged one for another to modify the characteristics of the item. In operation, the mounting pad is permanently fastened to an item by a strong connection which may be accomplished by molding in or manufacturing the mounting pad integral with the equipment item, applying a strong adhesive between the mounting pad and the item, or using a variety of fasteners including screws, nails, or the like. While the connection between the mounting pad and a sports equipment item is intended to be permanent, the image exhibit is removably attached to the mounting pad so that it may be quickly removed without damage to the item, pad, or exhibit.

Mounting pads of the interchangeable image exhibit system to be used for enhancing a sports board are preferably mounted on the upper surface of a sports board to be viewed by the user. Mounting pads may also be mounted on the lower surface of certain types of sports boards so long as the pad or image exhibit are not likely to be damaged by use of the board. In one embodiment, a mounting pad is flat and has opposite, planar sides. A first exhibit side is adapted to be fitted with an image exhibit and, opposite the mounting pad, a second fastening side is adapted for permanently connecting to a board. Whether mounted to the top or bottom of a board, it is preferable that protrusions of the mounting pad and exhibits are minimized to avoid inhibiting normal operation of the board.

As shown in FIG. 1, a sports board 002 is complemented with an interchangeable image exhibit system of the present invention having two simple mounting pads 004 molded in at opposite ends of the upper surface of the board. The mounting pads are relatively flat and have an open end 006 and closed end serving as a stop 008. Inlaid on top of the mounting pads 004 are identical image exhibits 010 such that the same image is presented at the nose and tail end of the board. The image exhibits shown in FIG. 1 are relatively flat, static image plates that maintain a consistent appearance while secured to the exhibit side of the mounting pad 004. Also secured by each mounting pad 004 and on top of each image exhibit 010 is a clear protective cover 012 that makes contact with the image exhibit along the cover perimeter. The remainder of the cover 012 is slightly raised and free from contact with the image exhibit.

The image exhibits 010 and covers 012 are secured to the mounting pads 004 by friction, whereby bends of the mounting pads 004 along opposite perimeter portions form a channel with opposing guides 014. The image exhibits 010 and covers 012 fit within the channels and have portions of their perimeters sandwiched under and between the guides 014. To install a corresponding image exhibit 010 and cover 012, the two are aligned and slid together into the mounting pad through its open end 006. When completely installed, the image exhibit 010 and cover 012 are positioned under and between the opposing guides and make contact with the closed end of the channel on the exhibit side of the mounting pad. The image plate and the cover are removed by sliding them out of the open end of the mounting pad when sufficient force is applied.

Figure 2:
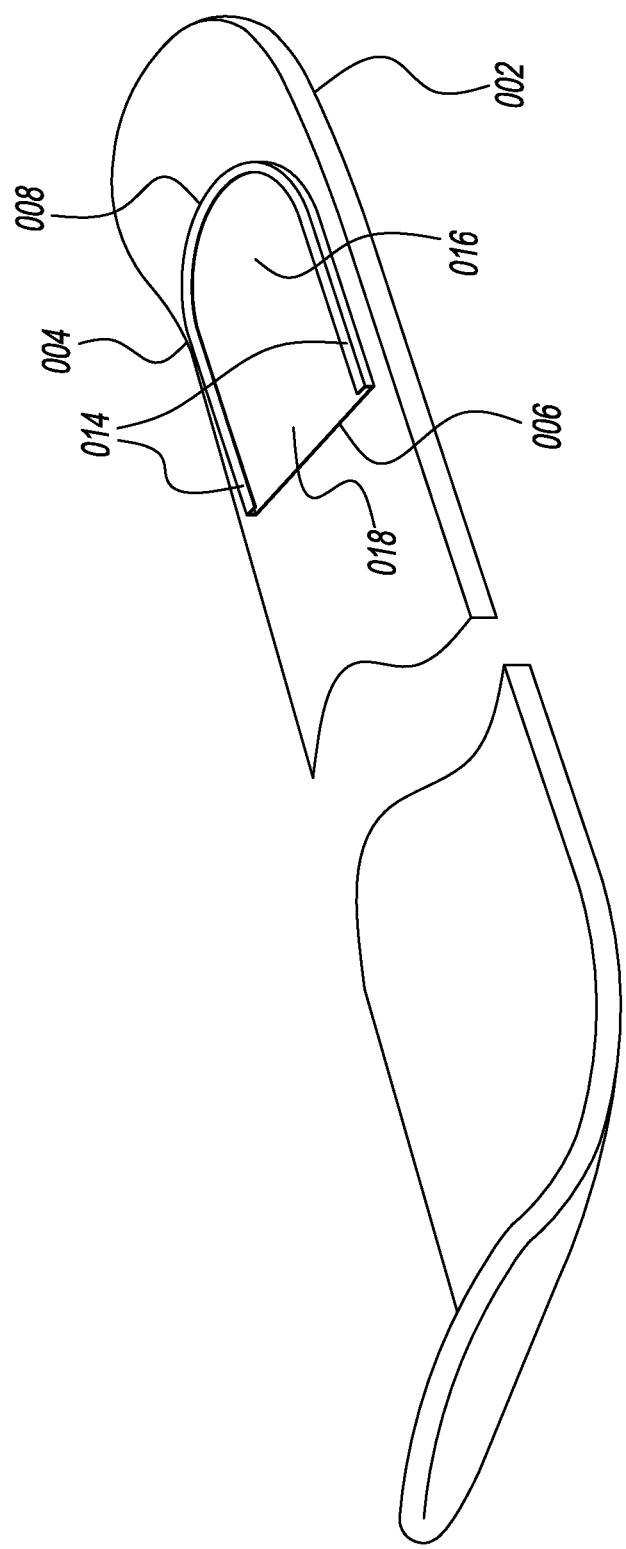
FIG. 2 is a perspective view of a mounting pad permanently adhered to the upper surface of a sports board.

Shown from a perspective view in FIG. 2, a similarly shaped mounting pad 004 is attached to a sports board 002. An open end 006 of the mounting pad 004 is oriented toward the center of the board 002 and a closed end serving as a stop 008 is positioned towards the tail. The shallow exhibit side 016 of the pad 004 is shown without either an image exhibit or protective cover. From this view, the channel 018 and guides 014 formed by bends of the mounting pad 004 are clearly visible.

Figure 3:
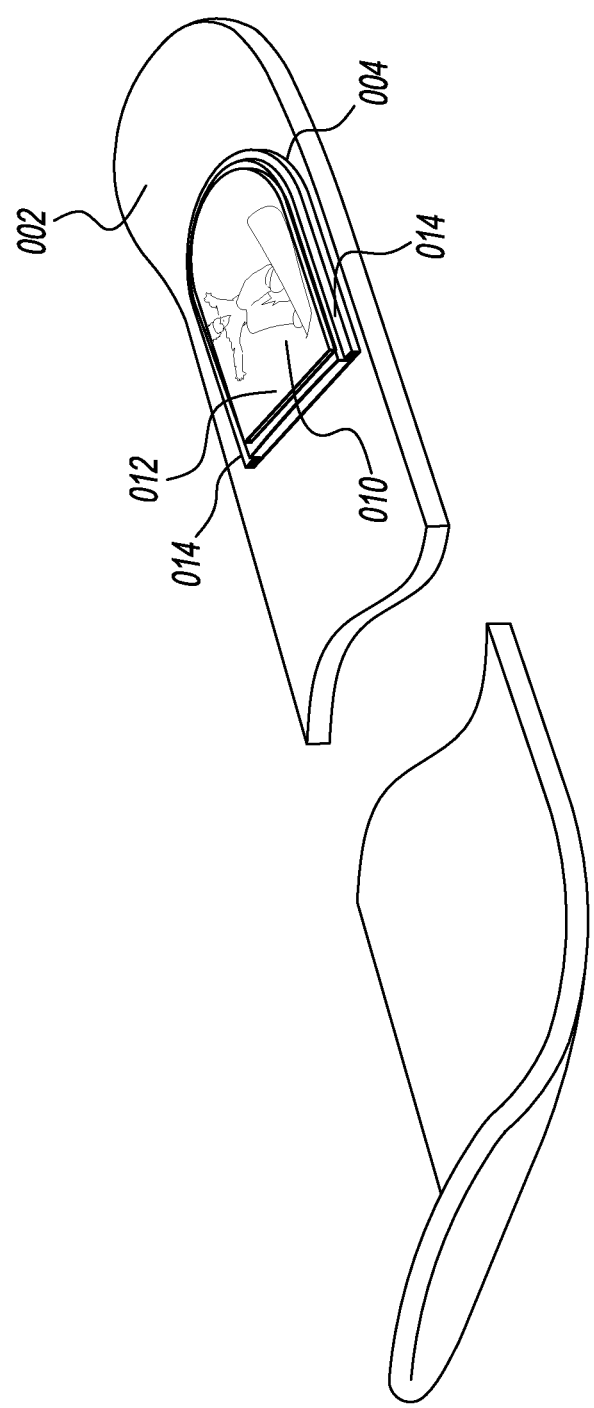
FIG. 3 is a perspective view of an attachable image exhibit fitted within a mounting pad at the tail end of a board.

In FIG. 3, the same board 002 is shown with an image exhibit 010 and protective cover 012 secured to the mounting pad 004, each having significant perimeter portions inserted under and between the guides 014. In the embodiment shown in FIG. 3, the image exhibit 010 is and image plate securely fitted within the channel formed by the mounting pad 004. However, in another embodiment an image plate is screwed down onto a mounting pad. In still another embodiment an image exhibit snaps into place using a shaped design analogous to the male/female naming conventions in electrical and mechanical trades that relate to connectors and receptacles, with the mounting pad being a receptacle and the image exhibit acting as a connector.

In still another embodiment, a mounting pad incorporates a spring loaded latch to be biased against an image exhibit in order to retain it securely to a mounting pad. Yet, when the latch is displaced, the image exhibit is easily removed. Image exhibits may similarly be held to mounting pads having bendable plastic tabs or latches that overlap portions of the exhibit, or with removable pins or clips as are known in the art if the exhibits are so adapted. In an alternate embodiment, a particular image exhibit is held securely to the exhibit side of a mounting pad by substantial contact with a clear protective cover that presses against the exhibit and biases it against the pad. The cover may be designed to snap or be hinged and secured to the mounting pad or in some embodiments to connect directly with a board.

Continuing to refer to the invention more generally, an image exhibit of the present invention may be secured to a mounting pad with or without a protective cover. In preferred embodiments a seal is positioned between a component of the system and a cover to encapsulate an image exhibit, protecting the exhibit from impacts, moisture, and other environmental conditions. As will be understood in the art, a mounting pad may be manufactured from wood, metal, plastic, composite, or a variety of other suitable materials providing similar opposing guides or other features by which an image exhibit, caddy and/or a protective cover may secured.

Referring again specifically to FIGS. 2 and 3, the mounting pad 004 is fixed to the board 002 using a strong adhesive. The relatively planar mounting pad comprises a fastening side (not shown) in contact with the board 002 opposite the exhibit side 016. The adhesive may be a contact adhesive or spray adhesive or another adhesive or binding material including but not limited to suitable glues, resins, and synthetics. Such adhesives may be applied to the fastening side of a mounting plate by a boarder just prior to attaching the pad to a board or may be included in the manufacturing of the board and/or mounting pad. Prior to being attached to a board, a peel-back wrapper may be used to cover a fastening side of a mounting pad to maintain cleanliness or preserve binding properties of adhesive already applied to the pad. The wrapper is preferably removed just before applying the mounting pad to the board for fastening. In other embodiments, a removable layer or material, or a solid jacket may be substituted for the wrapper.

Figure 4:
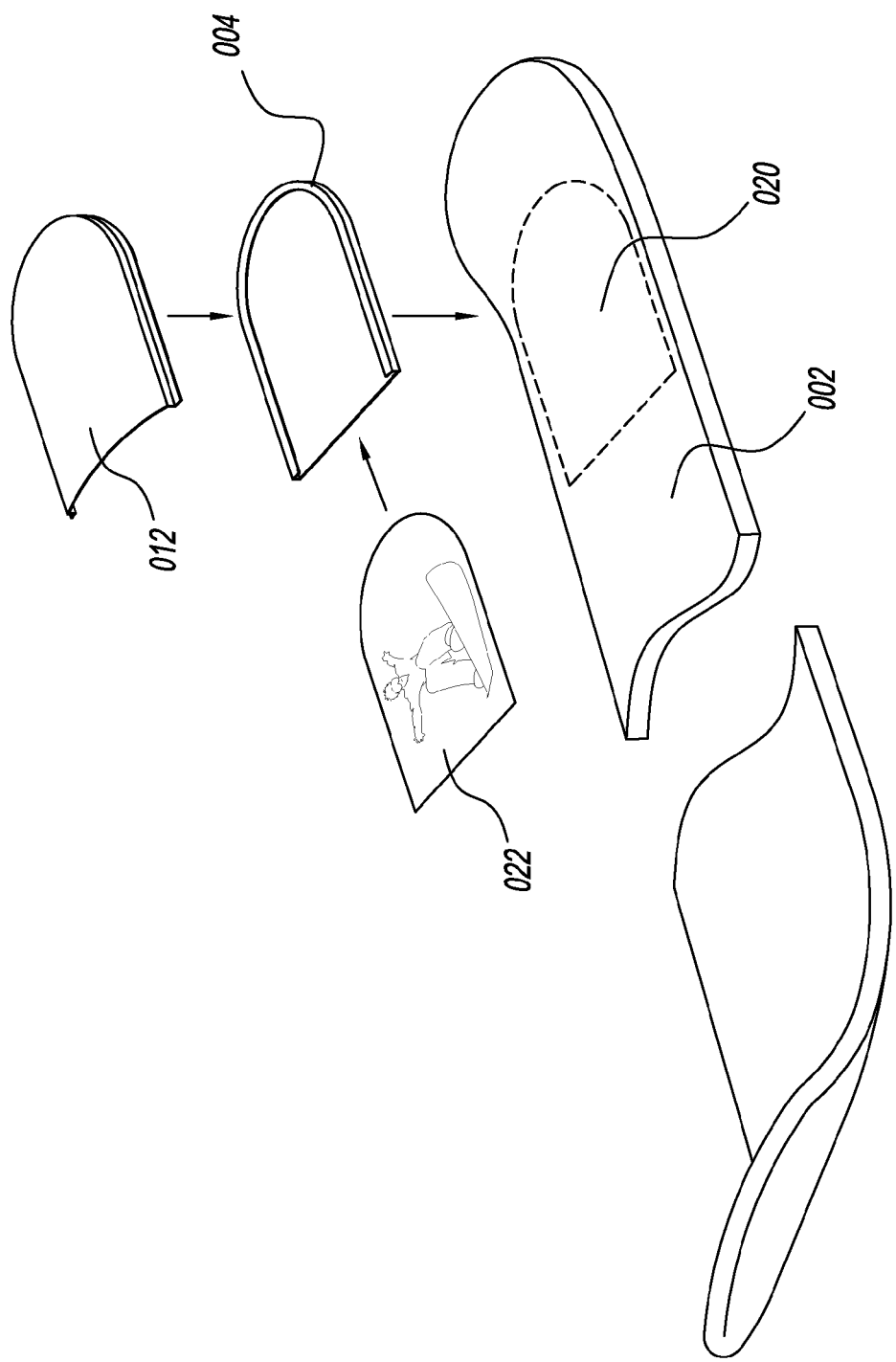
FIG. 4 is an exploded view showing the arrangement of interchangeable image exhibit system components as they are designed to be fitted to a sports board.

FIG. 4 shows the area 020 where a mounting pad 004 adheres to a board 002, and the arrangement for inserting an image exhibit on top of the mounting pad 004 and under a protective cover 012. In this embodiment the attachable image exhibit is a static image plate 022. To change image plates, a boarder removes the cover 012 and image plate 022, inserts a new image exhibit, and then re-secures the cover 012.

Referring again to the invention in general, mounting pads and image exhibits may vary in size but are preferably confined within the outer boundaries of a sports equipment item so as to not impede its performance. In some embodiments, an image plate may extend beyond the dimensions of a mounting pad and contain graphics or design that is defined or selected by the user. For example, a user may provide artwork for a custom-designed image plate that would conform in size and shape to a mounting pad of an interchangeable image exhibit system, but be personalized specifically for the user. An image plate may be constructed of one or more appropriate materials, for example but not limited to plastic, metal, chrome, or synthetic.

Alternatively, certain attachable image exhibits may provide functional enhancement to a sports equipment item instead of or in addition to enhanced appearance. Such image exhibits comprise substantially flat electronic display screens, smart phones, or fully assembled computing devices such as tablet computers, any of which are secured to a mounting pad in much the same way as a static image plate. In one embodiment, an electronic display screen image exhibit includes components to communicate with a personal electronic communication device for displaying visual media. In this embodiment there is no need to change image exhibits to provide a modified appearance or function for the sports equipment item because the display screen image is controlled and may be modified by input from the communication device.

Figure 5:
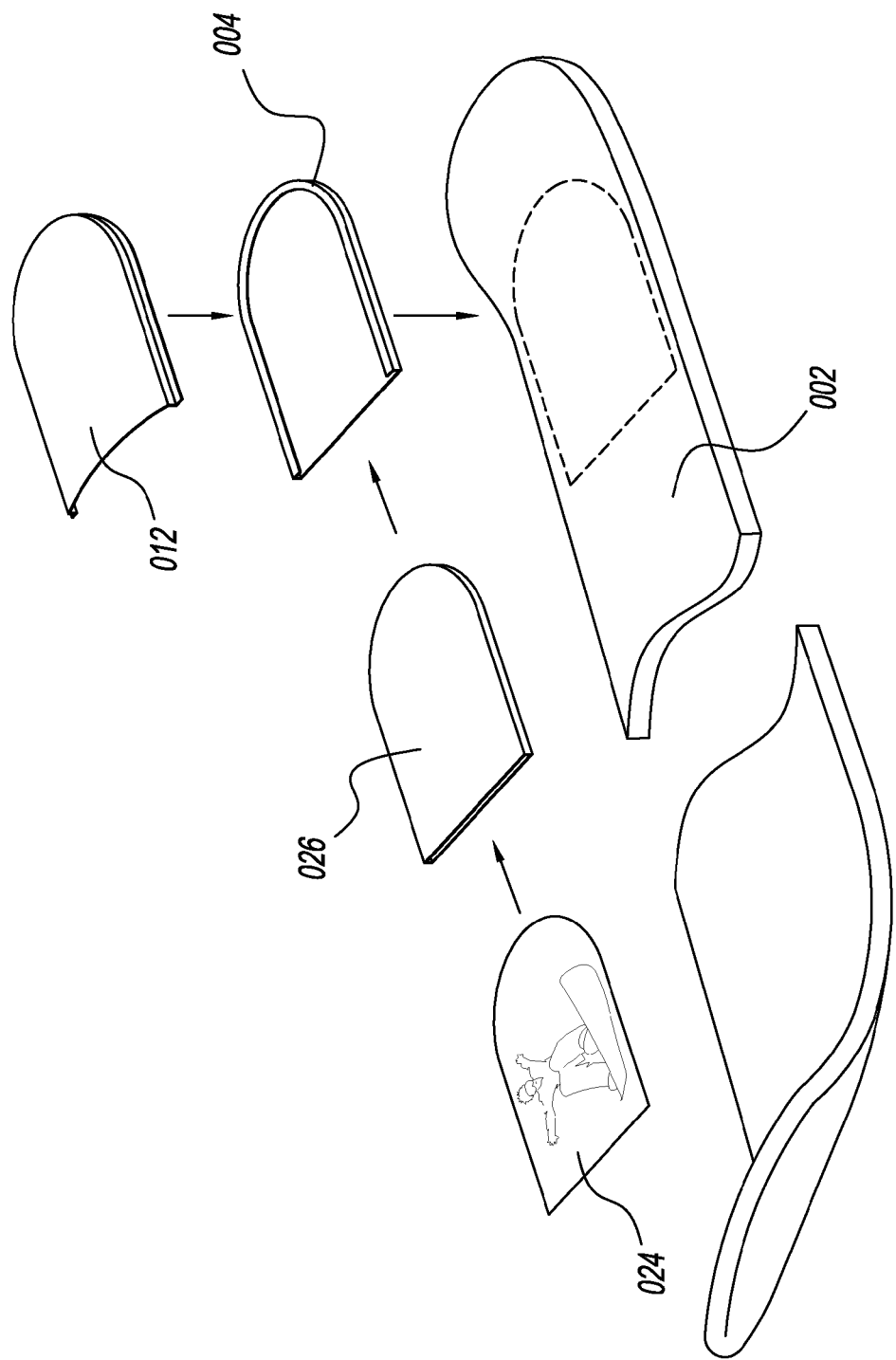
FIG. 5 is an exploded view the components of an image exhibit system having an electronic display screen that communicates with personal electronic communication devices to display images, connect with the Internet, and play back video camera recordings.

FIG. 5 shows an arrangement of components of an interchangeable image exhibit system in accordance with the present invention. In this embodiment, the sports equipment item is a snow board and the attachable image exhibit is an electronic display screen 024 that is inserted into a simple mounting pad 004 over a vibration dampening caddy 026. A see-through protective cover 012 is also fitted to the mounting pad 004 on top of the display screen 024. The protective cover 012 is smooth and treated to reduce glare. The cover is transparent but may be translucent or otherwise clear so long as it similarly allows for viewing of the display screen, preferably providing a full and unobstructed view.

In certain embodiments, electronic display screen image exhibits are made to communicate and be compatible with various personal electronic communication devices for example: the ANDROID available from Google (Menlo Park, Calif., USA); the I-PHONE available from Apple Inc. (Cupertino, Calif., USA; the GALAXY available from Samsung (Seoul, South Korea) or similar personal electronic communication devices) available through BlackBerry (Waterloo, Ontario, Canada),) Sony (Minato, Tokyo, Japan), Nokia (Espoo, Finland), LG (Seoul, South Korea) and other similarly functioning devices. In other embodiments of an interchangeable image exhibit system, electronic display screen image exhibits communicate with smaller, wearable communication devices or larger less portable tablets and computers.

Electronic display screens of the present invention communicating or interfacing with personal electronic communication devices may display decorative images, data, video, or other media. In some embodiments, display screens are encapsulated by a protective cover to be isolated from dirt, moisture, and other environmental conditions, and may be isolated from vibrations by also being fitted to a flexible mounting pad, and/or enclosed within a protective caddy. However protective the pad, caddy or cover may be, it remains preferable that display screens image exhibits are constructed of materials resistant to outdoor conditions, shaking, impacts, and other physical shocks.

Electronic display screen image exhibits of the present invention are controlled by input from wireless communications or more simply by data received through wires or cables. In one embodiment of the invention, an attachable display screen includes an internal power source, and an embedded computer processor and memory to receive and process data that affects an image to be displayed. Preferably, systems having electronic display screens that process data through wires or cables should include jacks or ports so that the wires or cables may be removed while the sports equipment item is being used.

Figure 6:
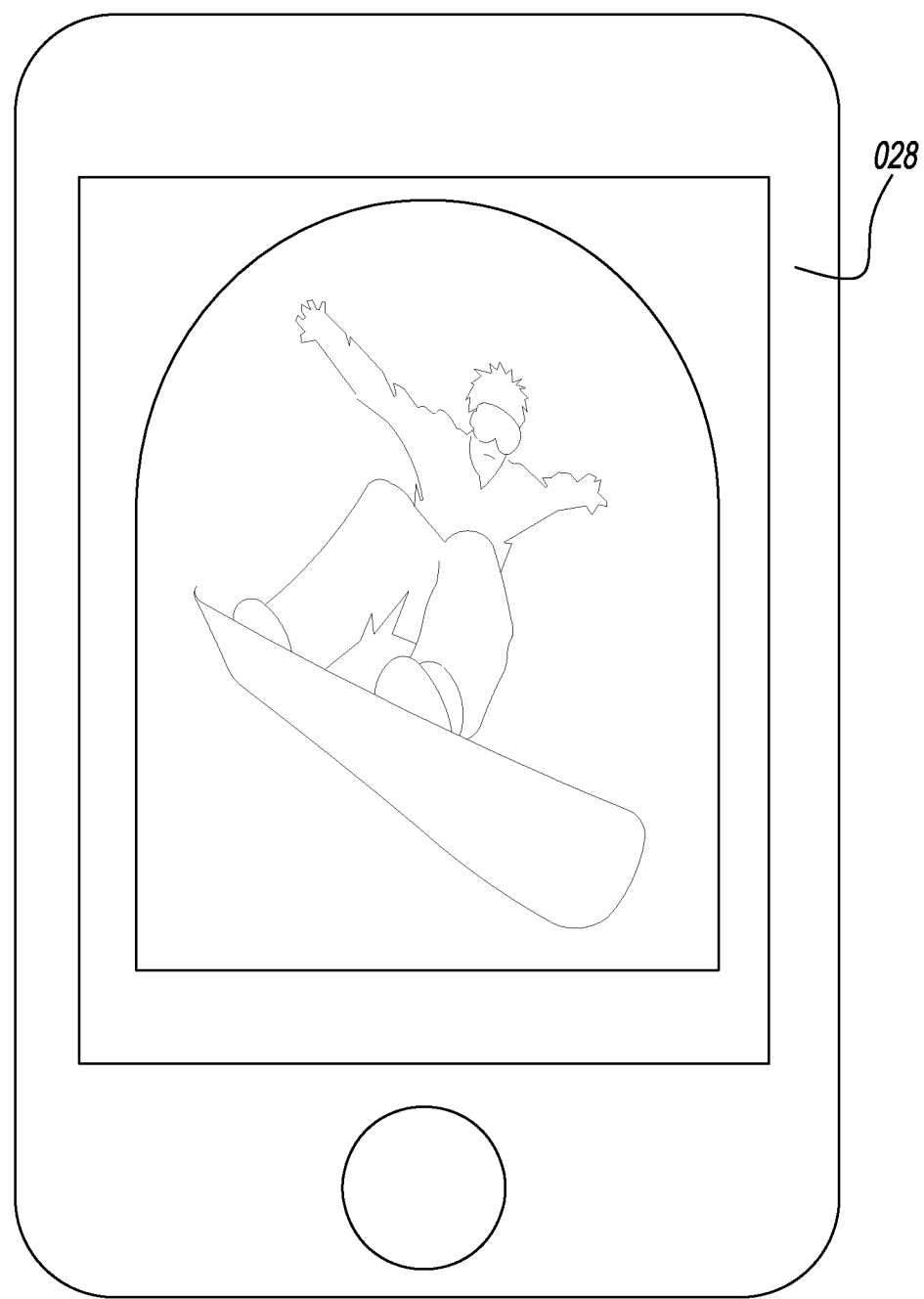
FIG. 6 is a front view of personal electronic communication device of the type that communicates with an electronic image display image exhibit of an interchangeable image exhibit system.
Figure 7:
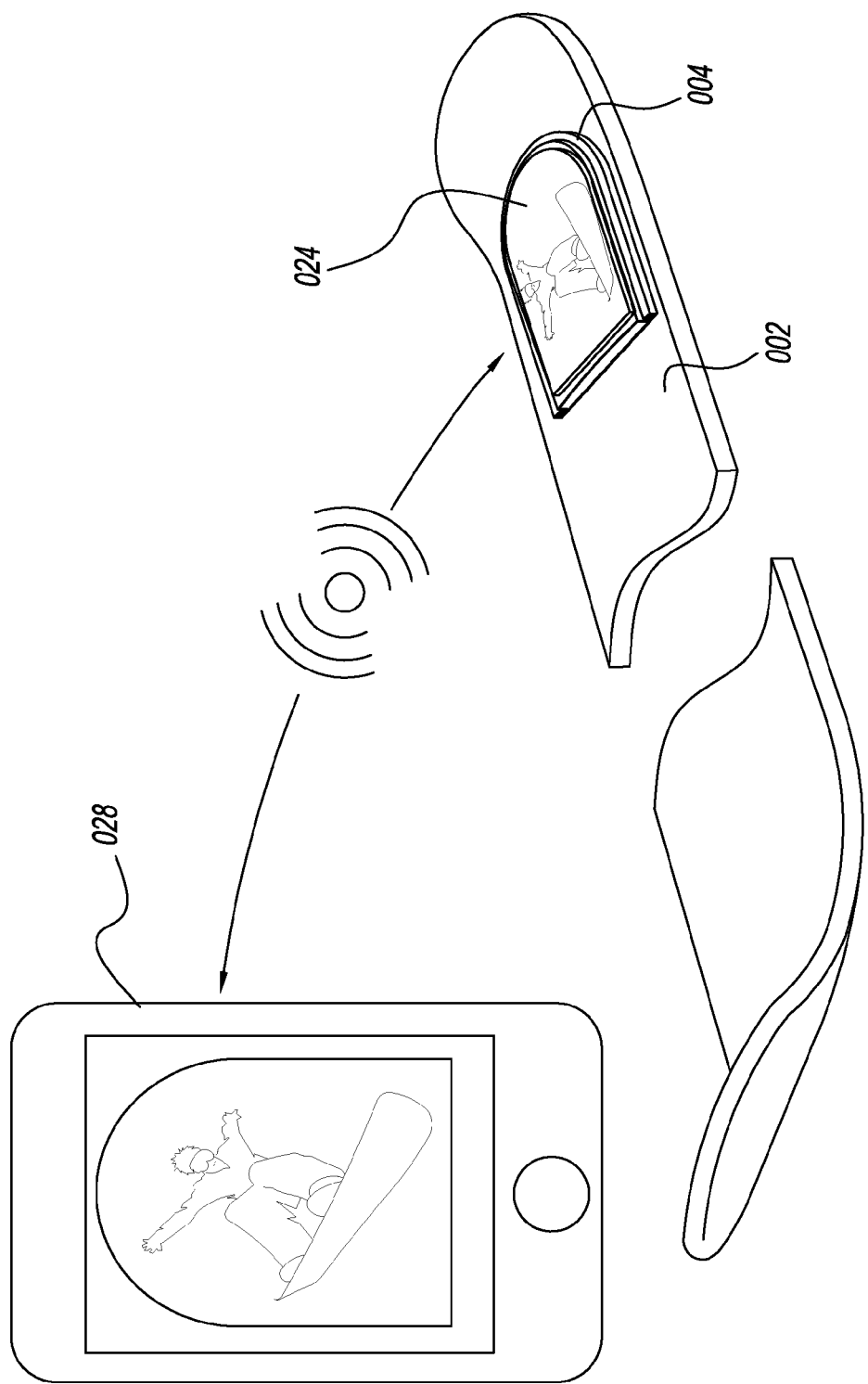
FIG. 7 is a perspective view representing a snowboard having an electronic display screen image exhibit communicating with a personal electronic communication device.

FIG. 6 shows a representative example of a personal electronic communication device 028 able to communicate with an electronic display screen image exhibit (not shown) of an interchangeable image exhibit system according to the present invention. As shown in FIG. 7, the same electronic communication device 028 provides electronic media by interfacing with a display screen 024 image exhibit fitted to a mounting pad 004 that is itself permanently fixed to a board 002. The electronic display screen 024 comprises a power source and basic components necessary for wireless communication and is configured to be compatible with the electronic communication device 028. While in proximity to the screen 024, the electronic communication device 028 facilitates various displays on the electronic display screen 024 by communicating via a communications protocol to facilitate playback, or otherwise provide data input to the screen. Although the personal electronic communication device is shown in FIG. 7 to be of the type that must be stored or carried, another personal electronic communication device such as a wearable type may be substituted to control the image features of the electronic display screen image exhibit. In either case, it is preferable that the electronic communication device be voice controlled to provide greater hands free operation.

Suitable communications protocols for the interchangeable image exhibit system shown in FIG. 7 and similar embodiments may include but are not limited to Wi-Fi communications (e.g., one of the 802.11 standards), Bluetooth™, Nordic™, high frequency systems (e.g., 900 MHz, 2.4 GHz, and 5.6 GHz communication systems), infrared, Global System for Mobile Communications (GSM), Synchronous Code Division Multiplexing (CDMA), General Packet Radio Service (GPRS), GSM Evolution (EDGE), combinations thereof, or any other suitable communications protocol.

In an alternate embodiment, a mobile application (mobile app) from a mobile operating system, for example but not limited to Apple App Store™, Google Play™, Windows Phone Store™ and BlackBerry App World™ may be used as a component of an interchangeable image exhibit enhancement system of the present invention. For instance, an operator of a sports equipment item may display an instructional video application that resides on the operator's own personal electronic communication device.

In some embodiments, electronic display screen image exhibits are unaccompanied by a personal electronic device. Instead, certain electronic display screens functioning as image exhibits according to the present invention comprise components to provide some or all of the functionality of an electronic communication device (e.g. an iPhone™). For example a display screen may comprise of a screen, a speaker, a microphone, software, a battery, a receiver/transmitter, a processor, and a memory for receiving, storing, processing, or caching data to display images and/or provide other media.

Referring to functional image exhibit systems more broadly, a display screen image exhibit of the present invention may also include a convenient user interface for allowing the operator to control one or more image features or components of an interchangeable image exhibit system such as a digital video camera or other recording device or both. For example, the convenient user interface may allow a user to control visual media displayed on an electronic display screen of a system (e.g., fast forward, rewind, pause, next, or slow-motion), the volume of audio media, playlist controls, the luminosity of the display, or any other operation of system components that may be electrically or mechanically controlled. The user interface may be any suitable user interface such as, for example, a button, keypad, dial, click wheel, touch screen or pad, multi-touch screen or pad, voice recognition, or any other suitable interface.

In a particular embodiment, an electronic display screen is housed in a vibration absorbing caddy attachable to a mounting pad that is fastened to sports equipment item. The electronic display screen communicates with a digital camera video recording device. The electronic display screen comprises a power source and other necessary components to communicate with the recording device and to be switched between the functions of displaying playback recorded earlier or displaying the recording of the camera in real time instead. For example, a GOPRO™ personal camera (Woodman Labs of San Mateo, Calif., USA) mounted to a sports board, or worn and operated as a "helmet cam" communicates with an electronic display screen having the required software, communication, and control components to provide playback to the electronic display screen from a previous recording or to display the recording in real time. Preferably, the caddy incorporates a see through protective cover to further protect the electronic display screen.

In alternative embodiments of an interchangeable image exhibit system, an electronic display screen image exhibit having a suitable user interface and related components communicates with and controls the function of another electronic display screen or a personal electronic communication device that is hand held, mounted for convenience, or worn by the user or another person. Referring generally to systems of the invention, personal electronic communication devices such as smart phones or tablets, etc. may be attached to mounting pads as an image exhibit to provide some or all of the potential functions of electronic display screens image exhibits already described.

In one such embodiment, a mounting pad is fastened to a paddle board and adapted for securing a substantially flat personal electronic communication device as an image exhibit. The communication device is enclosed by a caddy incorporating a clear cover. The communication device includes an interface and communicates with an electronic display screen that is also functioning as an image exhibit and situated on the opposite end of the same sports board. In this embodiment the electronic communication device may be controlled by the user to affect the image features shown on the digital display. In other embodiments the electronic display may incorporate a convenient user interface instead of or in addition to the user interface of the electronic communication device to affect the display of image features on itself or the electronic communication device or both and either device may communicate wirelessly with a recording device to gather images, video, or other data to be provided to the operator by one of the image exhibits.

In other embodiments, a mounting pad is adapted to secure a personal electronic communication device to a sports equipment item to simply interchange the functional image exhibit with similarly sized decorative image plates. In alternate related embodiments, a caddy is used with the electronic communication device or decorative image exhibits to make them compatible with a particular mounting pad. In still other embodiments, a system may include decorative and functional image exhibits simultaneously. For example, a static decorative image plate may be secured to a mounting pad on the tail of a paddle board while an electronic display screen or a personal electronic communication device is secured to a mounting pad on its nose.

Some components of an interchangeable image exhibit system are preferably selected or manufactured to minimize weight. For example, a mounting pad for a snow board is preferably constructed to weigh no more than 750 grams (1.65 lbs.), an image plate no more than 250 grams (0.55 lbs.), a display screen no more than 500 grams (1.1 lbs.), and a protective cover no more than 750 grams (1.65 lbs.). Components may also be selected for size so that they will conform to the dimensions of a particular sports equipment item without compromising its function. Preferably, image plates, display screens, and electronic communication devices fitted to mounting pads are substantially flat. In other words, it is preferable that image exhibits can be made to protrude no more than 2 inches from the surface of a sports equipment item when securely fitted to a shallow mounting pad.

Figure 8:
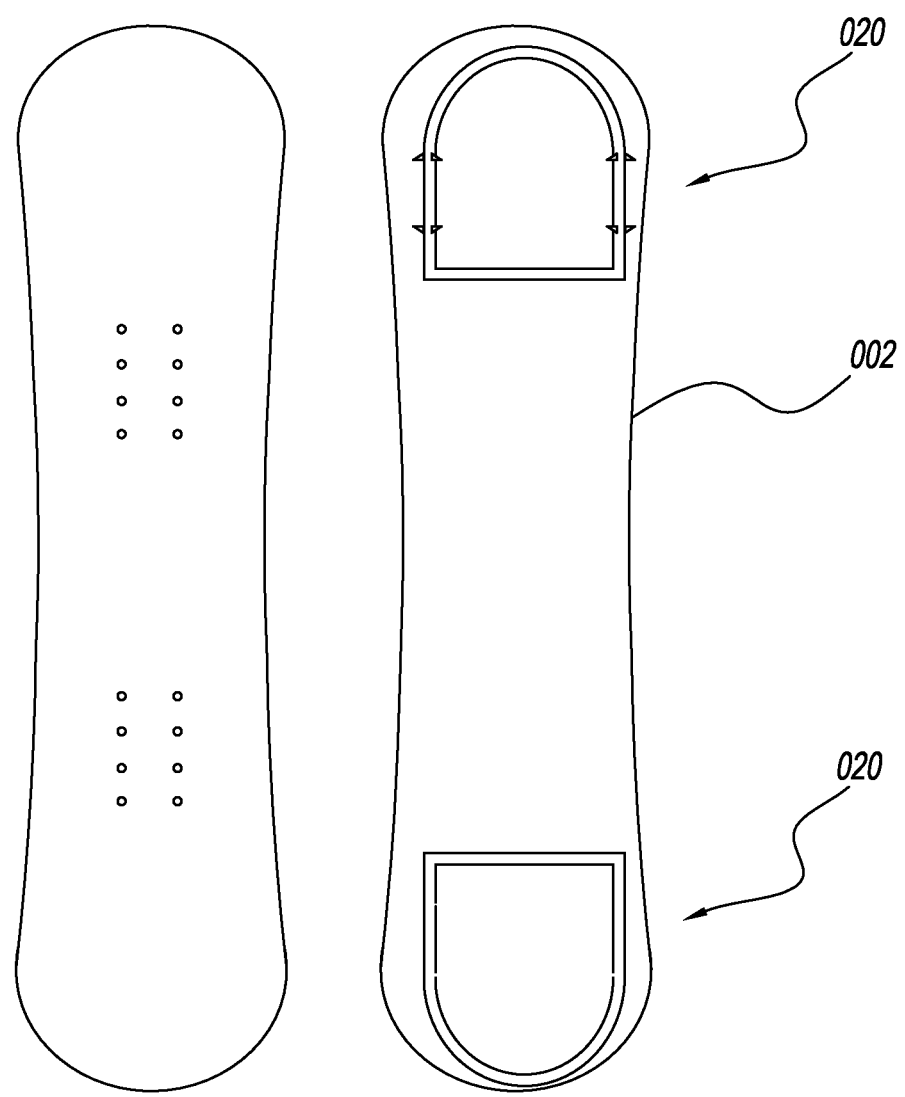
FIG. 8 is representation showing the preferred placement areas for situating a mounting pad on a typical sports board.

FIG. 8 shows preferred placement areas 020 for a mounting pad on a typical sports board 002. A mounting pad (not shown) may be manufactured integral with or adhered directly onto the board 002 at one or both ends. An image plate, display screen, electronic communication device, or other type of image exhibit can be fitted on top of and be secured to the mounting pad(s). A protective cover may also be applied over the image exhibit and secured in place, encapsulating the image exhibit.

Figure 9:
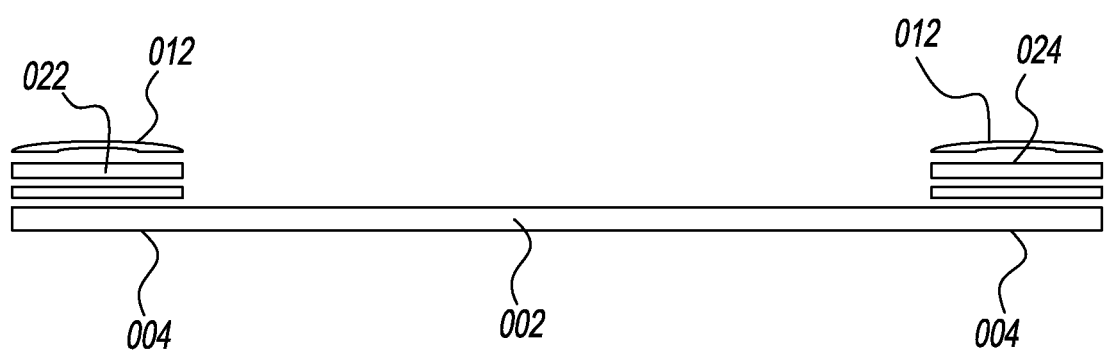
FIG. 9 is a representation showing the layers of components included in a preferred embodiment of an interchangeable image exhibit system to be used with a sports board.

FIG. 9 is diagrammatic side view showing component layers of a single embodiment of an interchangeable image exhibit system according to the present invention. In this embodiment, the system comprises a snowboard 002, on which is installed an attachable image plate 022 (at tail) and display screen 024 (at nose) on top of their respective mounting pads 004. Transparent, translucent, clear or otherwise see-through protective covers 012 are positioned over the image plate (tail) and display screen (nose). The protective covers 012 are preferably smooth and allow for full and unobstructed views of the image exhibits. All components are layered thinly to conform as much as possible to the inherent shape of the board. In other embodiments, an image plate may be at the nose and a display screen at the tail; image plates only may be applied at the nose and tail; or display screens may be the only image exhibit applied at the nose and tail.

Figure 10:
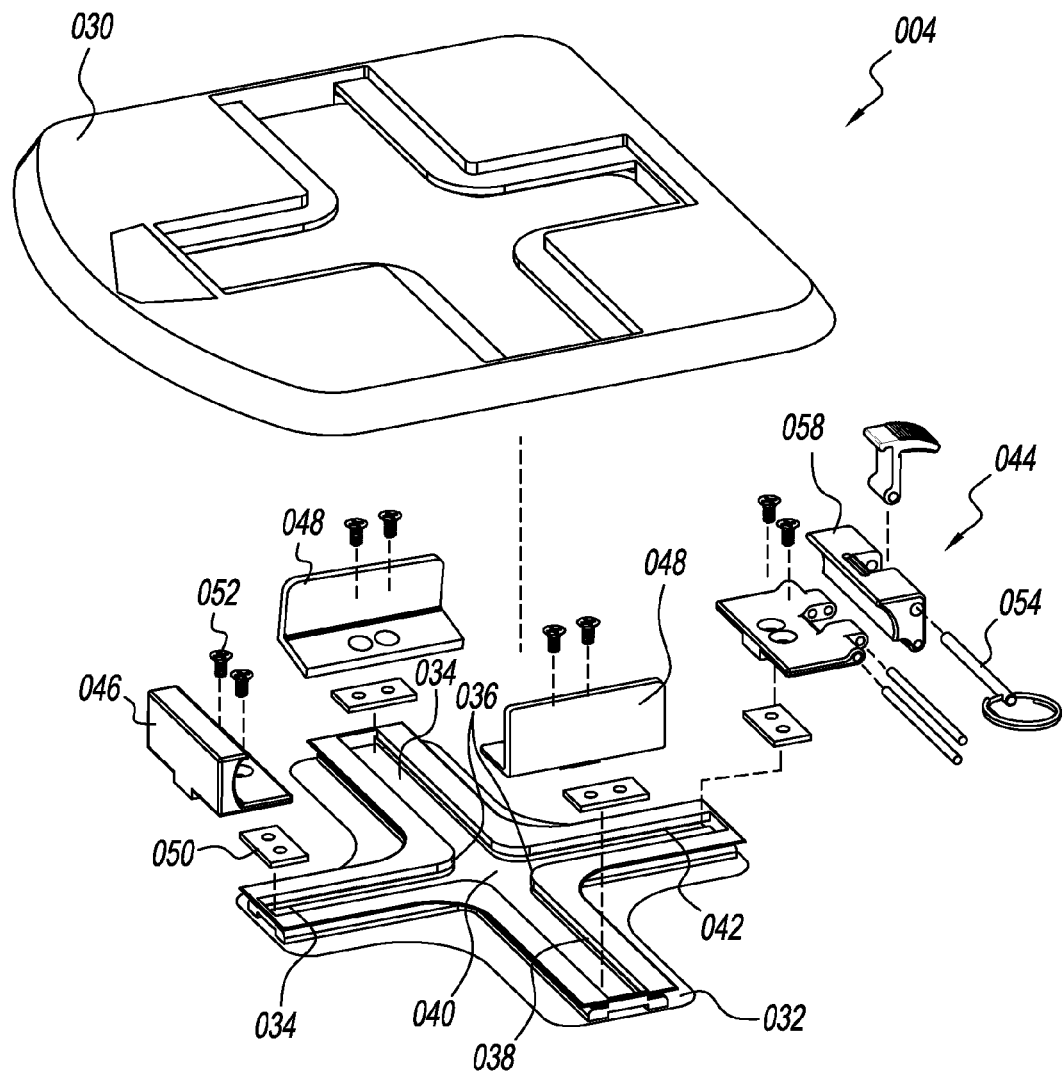
FIG. 10 is an exploded view of an adjustable mounting pad for attaching various different types and sizes of interchangeable image exhibits.

Referring now to a specific embodiment of a mounting pad to be used as component of a system of the present invention, FIG. 10 shows an exploded view of an adjustable mounting pad 004 that is ideal for attaching different sized image exhibits. The adjustable mounting pad 004 is shown from the image exhibit side and comprises a resilient cushion 030 and rigid plastic track 032. The track 032 is designed to be permanently fastened to a sports equipment item and fits together along its outside perimeter with the cushion 030 so that the cushion makes contact with and remains under an image exhibit (not shown) after the exhibit is attached.

The track 032 of the mounting pad comprises a pair of slots 034 penetrating the image exhibit side of the track 032. The slots 034 intersect perpendicularly at approximately the center of the track 032. The width of the slots is stepped so that each slot 034 is narrower toward the image exhibit side, so as to form pairs of opposing shoulders 036 protruding along the inside perimeter 038 of the track. The central intersection 040 of the slots is relieved so that the distance between opposing shoulders 036 at the intersection 040 is greater than the distance between opposing shoulders 036 at non-intersecting portions 042 of the slots 034.

In operation, the slots of the track 032 may be occupied by a set of slideable components which can be moved within the slots 034 to accommodate different sized image exhibits. In the embodiment shown in FIG. 10, one such slideable component shown is a pivoting catch 044. The catch 044 is situated at one end of the shorter of the two slots 034, across the intersection 040 from a slideable end stop 046 that is positioned at the opposite end of the same slot 034. At opposite ends of the longer slot 034, i.e. the slot intersecting the slot in which the catch 044 and stop 046 are situated, are a pair of opposing guides 048. Connected to each slideable component and under opposing shoulders 036 is a single planar nut 050. Each of the nuts 050 has two threaded openings for connecting to their corresponding slideable components with two machine screws 052. The screw heads are countersunk into the image exhibit side of the slideable components and include shanks that extend down into the slots 034, traversing the depth of the shoulders 036 before threading into the nuts 050.

To adjust the mounting pad 004 shown in FIG. 10 for a particular sized image exhibit, the guides 048, stop 046, and catch 044 are moved within the slots 034 of the track while the screws 052 are loosely connected to the nuts 050. After the components are situated along the slots at positions suitable for making contact with the perimeter of a desired image exhibit, the screws 052 are tightened to the nuts 050. When tightened, the screws 052 cause the slideable components and threaded planar nuts 050 to pinch the opposing shoulders 036 of the track 032 so that the slideable components are immobilized on the track.

Image exhibits may be attached to the adjustable mounting pad shown in FIG. 10 with or without a caddy or protective cover. When in operation to secure and image exhibit, the slideable components contact a caddy or image exhibit or cover along its outside perimeter. At the same time the pivoting catch 044 is maintained upright by a lock pin 054 which holds a portion of the catch in an upright position so that the catch 044 is biased against the image caddy or exhibit or cover. In preferred embodiments, the resilient cushion 030 is thicker than the track 032 so that when an exhibit is attached, the cushion 030 acts to spring the exhibit against the slideable components.

Figure 11:
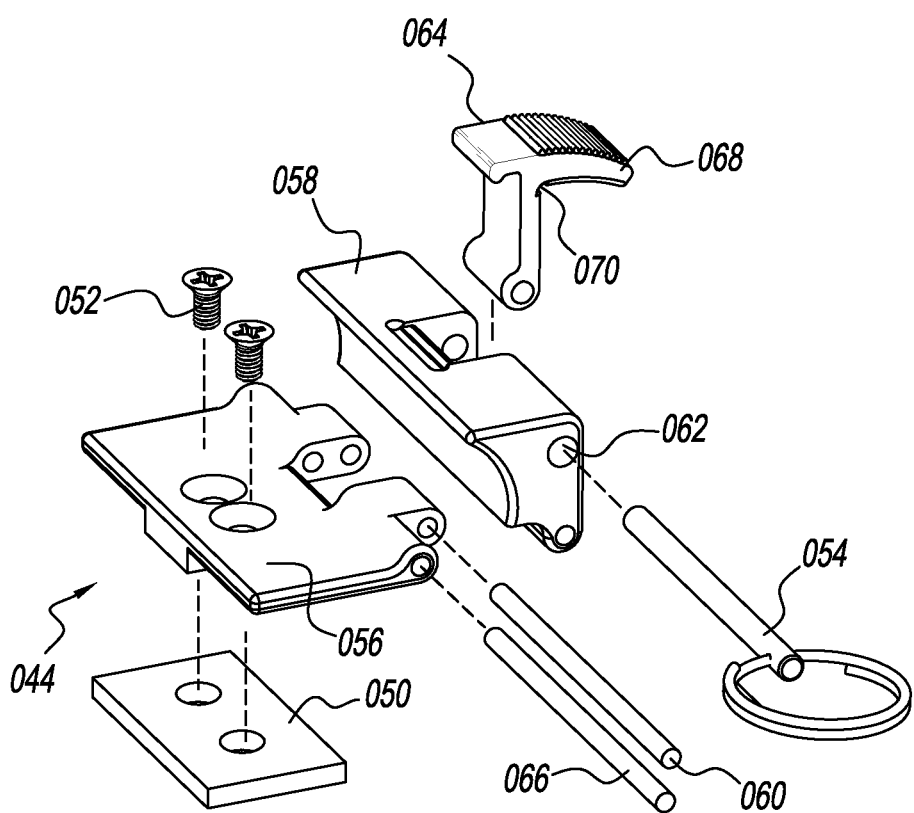
FIG. 11 is detailed view of a pivoting catch mechanism to be used with an adjustable mounting pad.

Shown in FIG. 11 is an exploded view of a pivoting catch of the type employed in the track slot of the adjustable mounting pad of FIG. 10. The catch 044 is comprised of a slideable base 056 through which two screws 052 extend downward from to connect with a corresponding planar nut 050. Hinged to the base 056 is a biasing cup 058 which pivots freely about a first hinge pin 060, through an arc in which there is a folded position and an upright position that can be assumed by the biasing cup 058. With the base 056 located on an adjustable mounting pad and the biasing cup 058 pivoted to its upright position, the cup 058 is situated to make contact with the perimeter of an image exhibit being secured by the pad. (not shown) The biasing cup 058 further comprises a cup bore 062 having an axis parallel to the first hinge pin 060 and with a diameter that allows for the insertion of a removable lock pin 054. Also hinged to the base 056 along a different but still parallel axis is a stabilizing arm 064 which pivots freely on a second hinge pin 066 between a folded position and an upright position. As can be seen in FIG. 11, the stabilizing arm 064 incorporates a textured handle 068 which forms a corner that serves as a partial bore 070 running parallel to the first and second hinge pins and the bore of the biasing cup 058. With the biasing cup 058 and stabilizing arm 064 each pivoted to align the cup bore 062 with the partial bore 070 of the stabilizing arm 064, a lock pin 054 may be inserted through the cup 058 and behind the arm 064 simultaneously. With the lock pin 054 so inserted, the base 056, cup 058 and arm 064 form a rigid triangle to provide bias against an image exhibit until the lock pin is pulled.

Adjusting the mounting pad of FIG. 10 requires the slideable components to be made immobile at particular locations along the slots 034 of the track 032. If the width between the two guides 048 is not already adjusted, an image exhibit of the desired dimension is placed between the guides 048 and the guides moved within their slot 034 to make firm contact with the exhibit. The exhibit is then removed from the guides 048 without disturbing the guide locations and the screws 052 of the guides are tightened to hold the guides 048 in place. With the guides 048 adjusted, the exhibit is again fitted onto the mounting pad 004 between the guides so that the exhibit contacts the end stop 046. As with the guides, if the end stop 046 is not already adjusted, the stop 046 should be slid along its corresponding slot 034 and its corresponding screws 052 tightened while the stop 046 is at a location that allows the stop to firmly contact the image exhibit, preferably when the exhibit is approximately centered with respect to the guides 048. Similarly, the pivoting catch 044 should be tightened in its slot 034 at a location that causes the catch 044 to be firmly biased against the image exhibit when the cup 058 of the catch is maintained by the lock pin 054 in its upright position.

Figure 12:
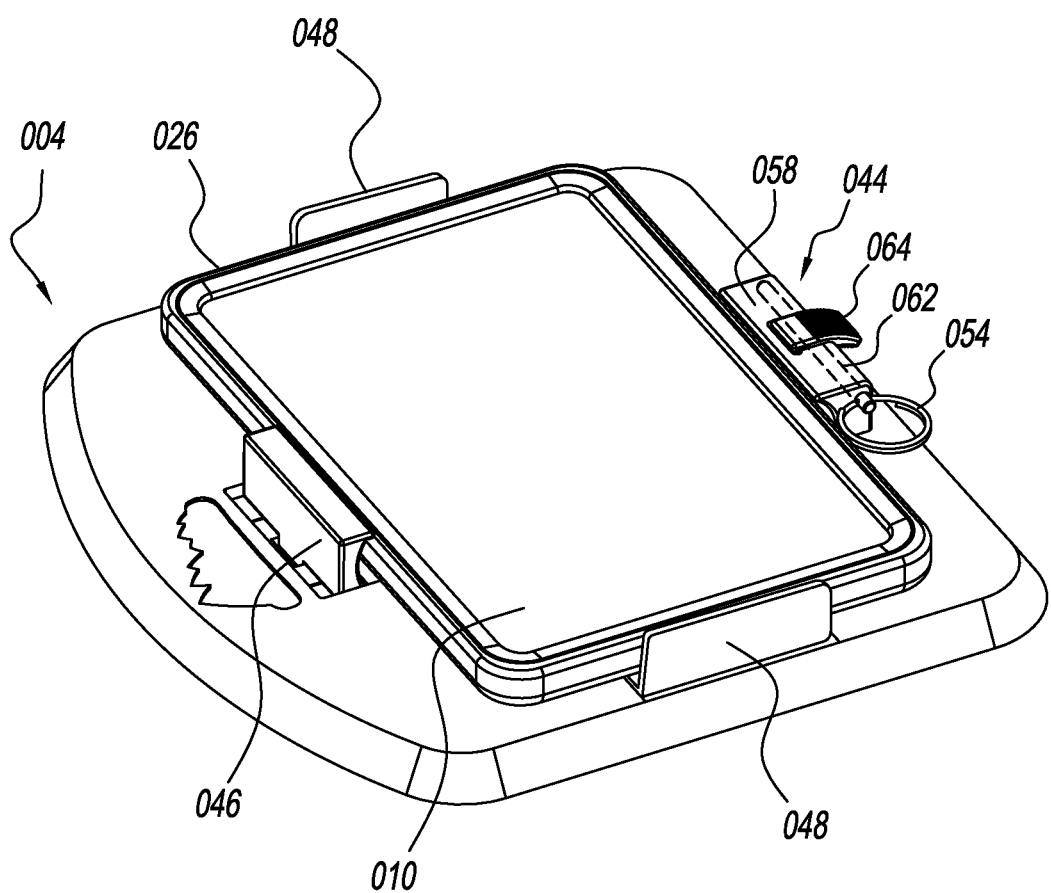
FIG. 12 is view of an adjustable mounting pad to which a personal electronic communication device is attached.

Shown in FIG. 12 is an adjustable mounting pad 004 with an image exhibit 010 attached and having a pivoting catch 044 and lock pin 054 as shown in FIG. 11. The biasing cup 058 and the stabilizing arm 064 of the pivoting catch 044 are shown in their upright positions. The image exhibit 010 is a personal electronic communication device and is enclosed by a protective caddy 026. With the slideable components already adjusted, attaching and removing the exhibit 010 from the mounting pad 004 can be rapidly and easily accomplished.

To attach the image exhibit to the mounting pad as shown in FIG. 12 the lock pin 054 is removed from the catch 044 and the arm 064 and cup 058 of the catch are pivoted to their folded positions so that the image exhibit 010 can be fitted between the opposing guides 048. While the exhibit 010 is pushed firmly against the stop 046 and with the biasing cup 058 of the catch firmly contacting the image exhibit 010, the stabilizing arm 064 is raised to its upright position to align the partial bore 070 (not shown) of the arm with the cup bore 062 while inserting the lock pin 054. With the pin 054 again in place in the pivoting catch, the catch 044 remains biased against the image exhibit 010 opposite the stop 046. Removing image exhibits from the adjustable mounting pad is accomplished by simply pulling the pin 054 from the catch 044, moving the pivoting catch components to their folded positions and sliding the exhibit 010 out from under the end stop 046 and away from the guides 048.

With the slideable components of an adjustable mounting pad located to accommodate a particular image exhibit, similarly sized exhibits may be rapidly and easily interchanged. For instance, the personal electronic communication device image exhibit shown in FIG. 12 may be interchanged with an electronic display screen. If the adjustable mounting pad is fastened to a sports board, the display screen may be configured to communicate with the personal electronic communication device removed from the pad so that image features are displayed on the display screen as the boarder is completing a run. In the alternative, an electronic recording device such as a digital video camera is enclosed by a caddy and attached to an adjustable mounting pad. The recording device communicates with a personal electronic communication device attached to a second adjustable mounting pad as an image exhibit, where an application in the communication device is used to control the video data delivery of the camera. In other embodiments, a personal electronic communication device is attached to or otherwise worn by a sports enthusiast and is in communication with a video camera. The personal electronic communication device comprises an interface to assist with controlling a video camera, and for processing and displaying the video on an electronic display screen image exhibit attached to a sports equipment item by an adjustable mounting pad. In these and other embodiments it is preferred that the display screen or personal electronic communication device receiving data from the video camera is voice controlled and programmed to display the video in real time.

Figure 13:
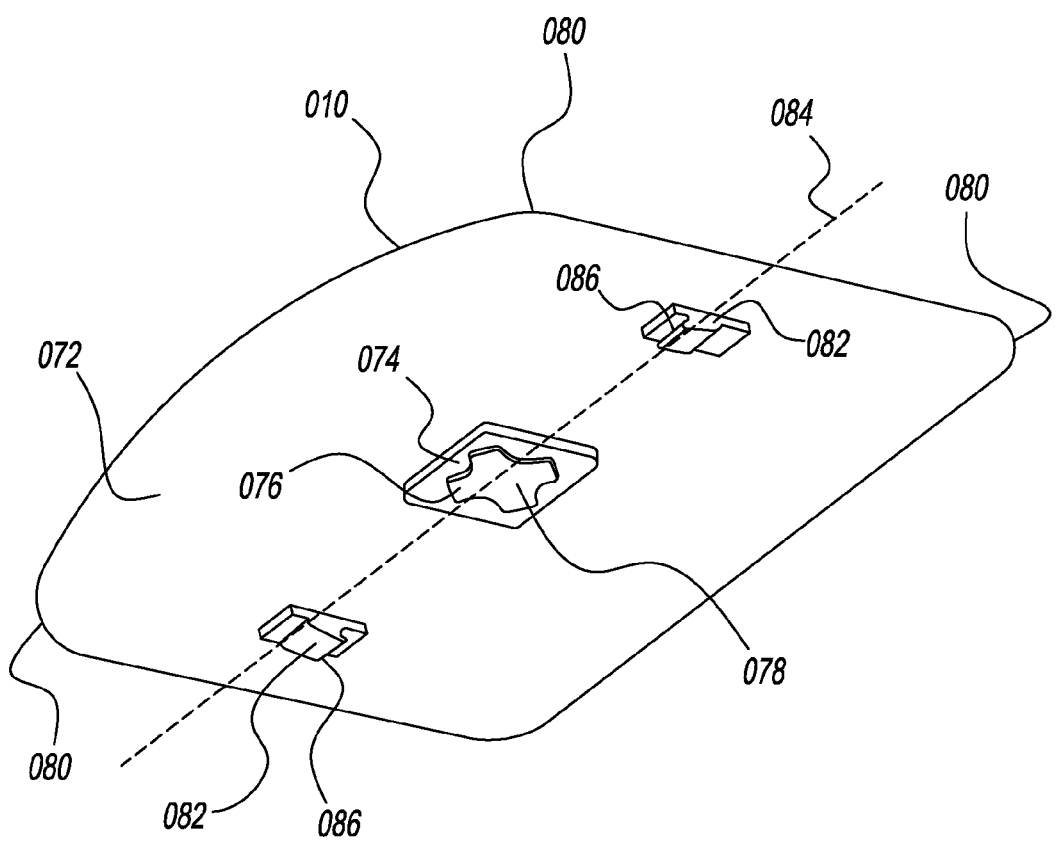
FIG. 13 is perspective view of a static image plate adapted for attachment to a slotted track of an adjustable mounting pad.

Shown in FIG. 13 is a specially adapted image exhibit of an interchangeable image exhibit system embodiment of the present invention. The image exhibit 010 is a rectangular, static image plate adapted for attachment to a mounting pad (not shown) without slideable components. The adapted image exhibit 010 is substantially flat and rigid and has opposite planar sides. When attached to a sports equipment item by a mounting pad, the adapted image exhibit provides image features appearing on the first planar side (not shown) to enhance the appearance of the sports equipment item. Opposite the image features and extending from the second planar side 072 of the adapted image exhibit 010 is a rigid cam button 074. The button 074 projects perpendicularly from approximately the center of the second planar side 072 and includes four lobes 076 extending radially and encircling the button 074 around its distal end 078. The lobes 076 are spaced evenly around the button at 90 degree intervals and all are within a plane that is parallel to and at a distance from the surface of the second planar side 072. The four lobes 076 are also positioned with respect to the rectangular exhibit 010 so that each lobe 076 is more or less oriented toward the corners 080 of the exhibit 010. Aligned with the center of the button 074 and on opposite portions of the second planar side 072 of the exhibit are two displaceable tabs 082. The positions of the button 074 and the two tabs 082 form points on an imaginary line 084 that divides the adapted exhibit 010 approximately in half. The tabs 082 are each connected to the second planar side 072 at one of their ends and have free ends oriented in opposite directions from the imaginary line 084. At the free end of each tab 082 is a bulbous portion that functions as a displaceable pawl 086.

Referring back again to the track of the adjustable mounting pad shown in FIG. 10, the track 032 is rigid and comprised of long and short perpendicular slots 034 which intersect one another at 90 degrees. The sides of the slots 034 are stepped to form opposing shoulders 036 under which component parts, e.g. planar nuts, can be retained. Although the slots 034 of the track can be readily fitted with slideable components as shown in FIG. 10, in an alternative embodiment the track 032 is coupled with an adapted image exhibit of the type that is shown in FIG. 13. In this alternative embodiment of an interchangeable image exhibit system and while referring simultaneously to FIGS. 10 and 13, the adapted exhibit 010 is held to a mounting pad without the aid of slideable components. Instead, the button 074 of the adapted exhibit 010 is received by the intersection 040 of the slots so that the lobes 076 of the button 074 are fitted under and retained by opposing shoulders 036 adjacent to the intersection 040 of the slots 034.

Figure 14:
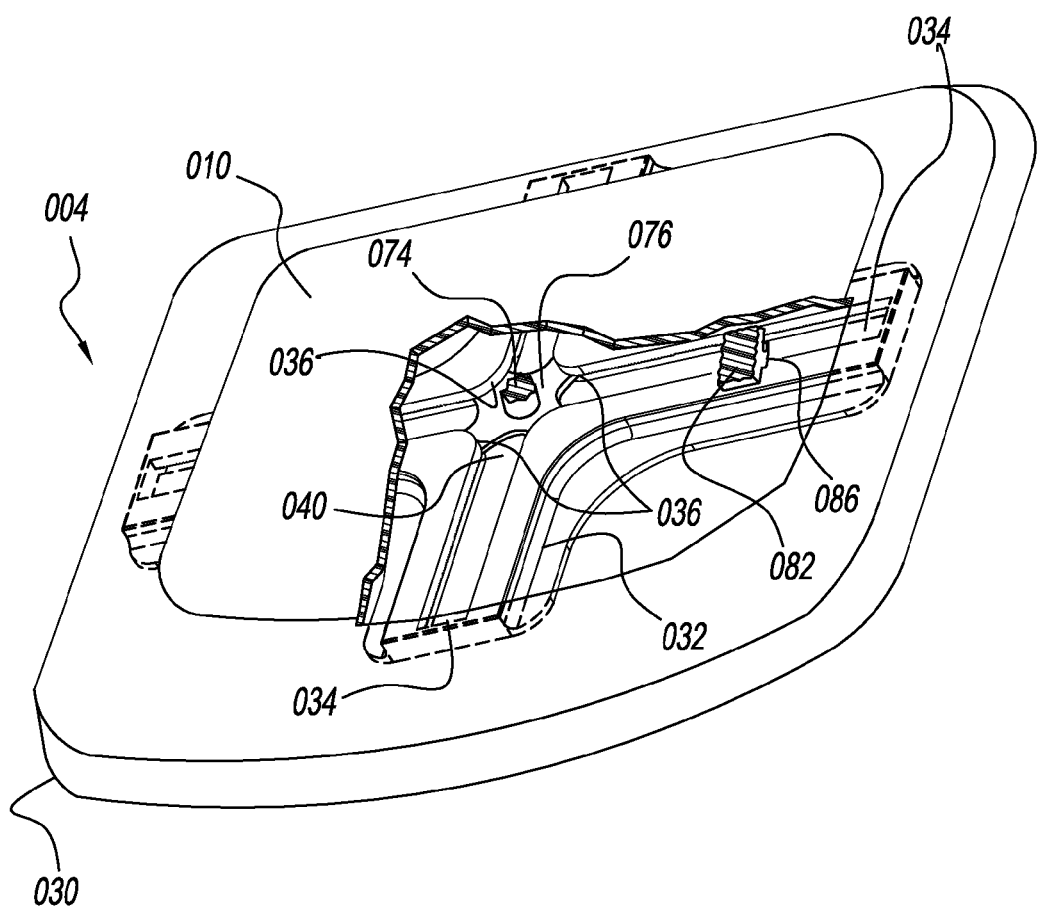
FIG. 14 is a cutaway view of a specially adapted static image plate attached to an adjustable mounting pad.

An adapted image exhibit of the type shown in FIG. 13 is shown in FIG. 14 attached to a mounting pad comprising a resilient cushion and a track that is similar to the track shown in FIG. 10. A portion of the adapted exhibit 010 in FIG. 14 is shown removed to provide a view of one of the tabs 082 and the button 074 of the exhibit, as well as their connections with the track 032. The lobes 076 of the adapted image exhibit button 074 are fitted under the shoulders 036 of the track 032 as previously described and the tabs 082 of the adapted image exhibit 010 rest within opposing ends of one of the slots 034 in the track. To secure the adapted image exhibit 010 to the mounting pad 004, the adapted image exhibit 010 is first positioned so that the button 074 is placed within the intersection 040, and the lobes 076 of the button are indexed within the slots 034. The image exhibit 010 is then pushed downward to compress the cushion 030 and rotated 45 degrees to secure the male to female connection made between the image exhibit and mounting pad. Compressing the cushion 030 moves the lobes 076 down within the slots 034, and after the adapted image exhibit 010 is rotated, the lobes 076 are positioned under the shoulders 036 near the intersection 040 of the track. At the same time, rotation of the adapted image exhibit positions its tabs 082 to align with the longer slot. In position and fully attached, the pawls 086 of the tabs 082 engage the longer slot 034 at opposing ends, thereby preventing the adapted image exhibit 010 from rotating and keeping it secured to the mounting pad 004. With the tab pawls 086 in the slot, the adapted image exhibit 010 is prevented from rotating until enough force is applied to the adapted image exhibit 010 to extract the tabs 082 from within the longer slot 034.

In other related embodiments, an adapted image exhibit includes a lobed button, but is without tabs to prevent rotation. The adapted image exhibit is instead prevented from rotating with respect to a slotted track by significant friction between the image exhibit and a resilient cushion surrounding the track. In still another embodiment, a mounting pad is comprised of a track having two intersecting slots and a resilient cushion around the outside perimeter of the track. The track is formed with recesses that correspond to the shape of button lobes of an image plate that is adapted for coupling with the track. The recesses are not visible from the image exhibit side of the mounting pad and are accessible only from within the intersection of the slots. The adapted image exhibit can couple with the recessed track only after significant force is used to compress the resilient cushion while the button is positioned in the intersection of the track. With sufficient force applied, the adapted image exhibit is rotated to align the lobes with the recesses of the track and then released to allow the lobes to be pushed back up by the resilient cushion into the recesses. After the adapted image exhibit has been released, the recesses of the track capture the lobes and the adapted image exhibit cannot be rotated until the resilient cushion is again compressed.

Referring now to the invention in general, it will now be recognized that a wide variety of slot arrangements may be used to secure image exhibits to mounting pads of an interchangeable image exhibit system according to the present invention. A single, triple or multi slot arrangement may be feasible with or without slideable components. As will also be understood by those skilled in the art, a resilient cushion situated under an image exhibit may be replaced in many embodiments by a compressible spring. In other embodiments, an adaptive caddy encloses a functional image exhibit for attaching, without slideable components, to a track of a mounting pad. Furthermore, the types of buttons and tabs that can be used to secure an image exhibit to a mounting pad are considerably numerous.

The above described embodiments of the present invention are presented for illustration purposes and are not intended to limit the scope of the disclosure or potential claims. It should be understood that this invention may be implemented on any suitable sports equipment item and that embodiments of an interchangeable image exhibit systems according to the present invention may be applied to other types of equipment or structures. For example, the principles of this invention may be applied to snowboards, surfboards, wakeboards, paddleboards, skateboards and other new or existing board types as well as other kinds of sports equipment and structures such as canoes, gondolas, etc. In some embodiments of the present invention, an interchangeable image exhibit may even be attached to the wall of a shower to provide hands free operation of an interchangeable image exhibit system component.

The particular embodiments described and illustrated are not intended to be limiting. From the foregoing disclosure it will now be apparent to persons skilled in that art that numerous changes and variations may be made without departing from the spirit and scope of the invention as exemplified by the appended claims.

I claim:

1. An interchangeable image exhibit system comprising:
    a mounting pad for removably securing an image exhibit to a sports equipment item for use outdoors, said mounting pad having an exhibit side adapted for receiving the image exhibit and a fastening side for permanently fastening the mounting pad flush on a flat surface of the sports equipment item;
    at least one said image exhibit having image features, said image exhibit attaching removeably and displaying said image features while attached to said mounting pad, said mounting pad operating between said image exhibit and the sports equipment item to facilitate attachment and removal of said image exhibit while the mounting pad is permanently fastened to the sports equipment item;
    an external slot on the exhibit side and at least one slideable component whereby said slideable component is moveable within said slot to accommodate different sized image exhibits while the mounting pad is attached to the sports equipment item; wherein the at least one slideable component is a locking catch, and whereby said image exhibit is secured to said mounting pad by contact with said locking catch.

2. The interchangeable image exhibit system of claim 1 further comprising opposing guides on the exhibit side of said mounting pad, said opposing guides and said mounting pad forming a channel in which said image exhibit is removeably secured.

3. The interchangeable image exhibit system of claim 2 further comprising a caddy for enclosing the image exhibit, said caddy being adapted to connect with said mounting pad by fitting between said opposing guides.

4. The interchangeable image exhibit system of claim 2 wherein the opposing guides are adjustable for width across the mounting pad to accommodate different sized image exhibits.

5. The interchangeable image exhibit system of claim 2 further comprising a resilient cushion on the exhibit side of the mounting pad and wherein said image exhibit is biased away from the exhibit side of said mounting pad and against the opposing guides by the resilient cushion.

6. The interchangeable image exhibit system of claim 1 wherein the image exhibit is one selected from the group of: a smart phone, a tablet, an electronic display screen or a personal electronic communication device, whereby said image exhibit provides virtual image features to enhance appearance or function of the sports equipment item.

7. The interchangeable image exhibit system of claim 6, wherein said image exhibit communicates wirelessly.

8. The interchangeable image exhibit system of claim 7 wherein said image exhibit communicates with a digital video camera.

9. The interchangeable image exhibit system of claim 6, wherein the image exhibit is voice controlled.

10. The interchangeable image exhibit system of claim 1 wherein the sports equipment item is manufactured for outdoor use.

11. The interchangeable image exhibit system of claim 10 wherein the sports equipment item is a sports board.

12. The interchangeable image exhibit system of claim 10 wherein the mounting pad is manufactured integral with the sports equipment item.

13. The interchangeable image exhibit system of claim 1 further comprising a clear protective cover adapted for encapsulating the image exhibit while the image exhibit is secured to the mounting pad and wherein the image exhibit is visible through the protective cover.

14. The interchangeable image exhibit system of claim 1 wherein the locking catch pivots to secure the image exhibit.

* * * * *